US012808846B2

(12) United States Patent
Kocurek

(10) Patent No.: US 12,808,846 B2
(45) Date of Patent: Nov. 24, 2026

(54) PORTABLE ARTICULATING ULTRASONIC INSPECTION SCANNING DEVICE AND METHOD

(71) Applicant: CONOCOPHILLIPS COMPANY, Houston, TX (US)

(72) Inventor: Christopher George Kocurek, Houston, TX (US)

(73) Assignee: CONOCOPHILLIPS COMPANY, Houston, TX (US)

(*) Notice: Subject to any disclaimer, the term of this patent is extended or adjusted under 35 U.S.C. 154(b) by 0 days.

(21) Appl. No.: 16/985,873

(22) Filed: Aug. 5, 2020

(65) Prior Publication Data

US 2021/0041400 A1 Feb. 11, 2021

Related U.S. Application Data

(60) Provisional application No. 62/882,871, filed on Aug. 5, 2019.

(51) Int. Cl.

*G01N 29/06* (2006.01)
*G01B 11/00* (2006.01)
*G01B 11/24* (2006.01)
*G01B 17/06* (2006.01)
*G01N 29/04* (2006.01)
*G01N 29/265* (2006.01)

(52) U.S. Cl.

CPC ....... *G01N 29/0609* (2013.01); *G01N 29/043* (2013.01); *G01B 11/005* (2013.01); *G01B 11/24* (2013.01); *G01B 17/06* (2013.01); *G01N 29/0654* (2013.01); *G01N 29/265* (2013.01)

(58) Field of Classification Search

CPC ............. G01N 29/0609; G01N 29/043; G01N 29/265; G01N 29/0654; G01N 29/225; G01N 2291/0258; G01B 11/005; G01B 11/24; G01B 17/06

USPC ........................................................... 73/524

See application file for complete search history.

(56) References Cited

U.S. PATENT DOCUMENTS 3,426,585 A 2/1969 Zemanek, Jr. et al.
4,492,119 A 1/1985 Dulapa et al.
4,596,143 A 6/1986 Norel
5,475,613 A * 12/1995 Itoga .................. G01N 29/225 600/443
7,921,575 B2 4/2011 Little (Continued)

FOREIGN PATENT DOCUMENTS

CN 1761871 A * 4/2006 ........... G01N 17/006
CN 105190231 A * 12/2015 ............ G01B 21/04

(Continued)

OTHER PUBLICATIONS

International Search Report for PCT/US2020/045025 mailed Nov. 20, 2020; 2 pgs.

*Primary Examiner* — Peter J Macchiarolo
*Assistant Examiner* — Monica S Young
(74) *Attorney, Agent, or Firm* — CONOCOPHILLIPS COMPANY

(57) ABSTRACT

Methods of assessing internal features of oilfield equipment including elbows, connections, valves, branches, olets, and other structures include the methods and apparatus for determining the physical geometric boundaries of oilfield structures using an automated articulating arm with an external laser scanner and an ultrasonic probe.

15 Claims, 3 Drawing Sheets

Combined Articulating Laser Scanner and Ultrasonic Probe

(56) References Cited

U.S. PATENT DOCUMENTS

| | | | | |
|---|---|---|---|---|
| 8,240,210 | B2 | 8/2012 | Wu | |
| 8,983,794 | B1 * | 3/2015 | Motzer | G01B 21/04 702/155 |
| 9,594,059 | B1 * | 3/2017 | Brady | G01N 29/225 |
| 2006/0288756 | A1 | 12/2006 | De Meurechy | |
| 2007/0039390 | A1 * | 2/2007 | Duncan | G01N 29/265 73/606 |
| 2009/0165317 | A1 | 7/2009 | Little | |
| 2011/0072905 | A1 | 3/2011 | Lam et al. | |
| 2013/0289766 | A1 * | 10/2013 | Hafenrichter | G01N 29/28 901/1 |
| 2013/0333896 | A1 | 12/2013 | Barnes et al. | |
| 2014/0238136 | A1 * | 8/2014 | Ten Grotenhuis | G01N 29/11 73/592 |
| 2014/0260627 | A1 * | 9/2014 | Ferrari | G01B 21/04 73/618 |
| 2015/0362305 | A1 * | 12/2015 | Ferrari | G01D 5/34 33/503 |
| 2018/0128657 | A1 * | 5/2018 | Crothers | G01N 29/225 |
| 2019/0094010 | A1 * | 3/2019 | Demiter | G01B 7/008 |
| 2019/0339687 | A1 * | 11/2019 | Cella | H04B 17/23 |
| 2019/0339688 | A1 * | 11/2019 | Cella | H04L 1/18 |
| 2020/0034495 | A1 * | 1/2020 | Riding | G01N 29/27 |

FOREIGN PATENT DOCUMENTS

| | | | | | |
|---|---|---|---|---|---|
| CN | 106537135 | A | * | 3/2017 | G01B 11/007 |
| CN | 111610251 | A | * | 9/2020 | B23K 11/0026 |
| CN | 110763766 | B | * | 3/2022 | G01N 29/069 |
| DE | 10259653 | B3 | * | 4/2004 | G01N 29/225 |
| EP | 1615027 | A1 | * | 1/2006 | G01N 29/225 |
| JP | 2020535439 | A | * | 12/2020 | G01N 29/043 |
| WO | 92/18862 | | | 10/1992 | |
| WO | WO-2019110024 | A1 | * | 6/2019 | G01B 11/24 |
| WO | WO-2021068848 | A1 | * | 4/2021 | B25J 15/0019 |

* cited by examiner

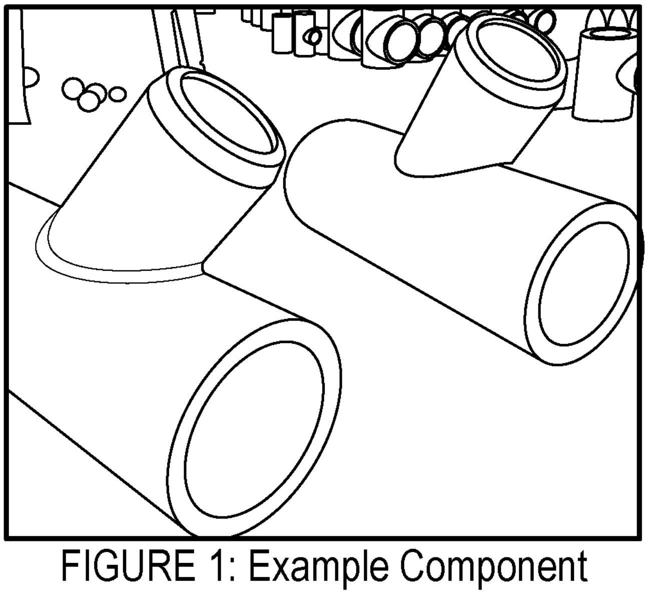
FIGURE 1: Example Component
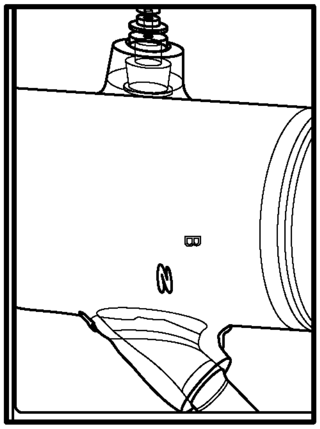
FIGURE 2: RT/X-Ray Imaging
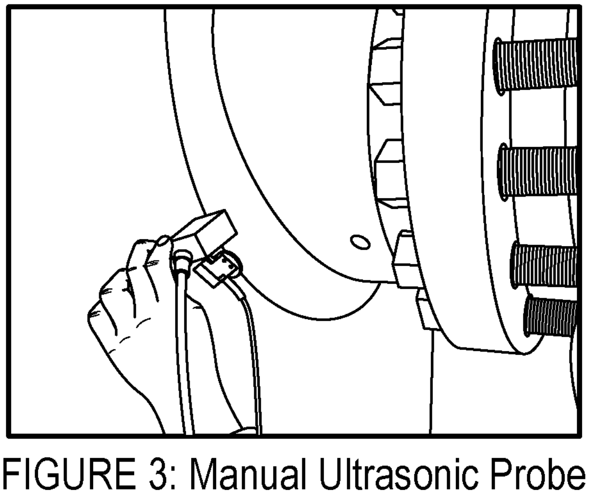
FIGURE 3: Manual Ultrasonic Probe

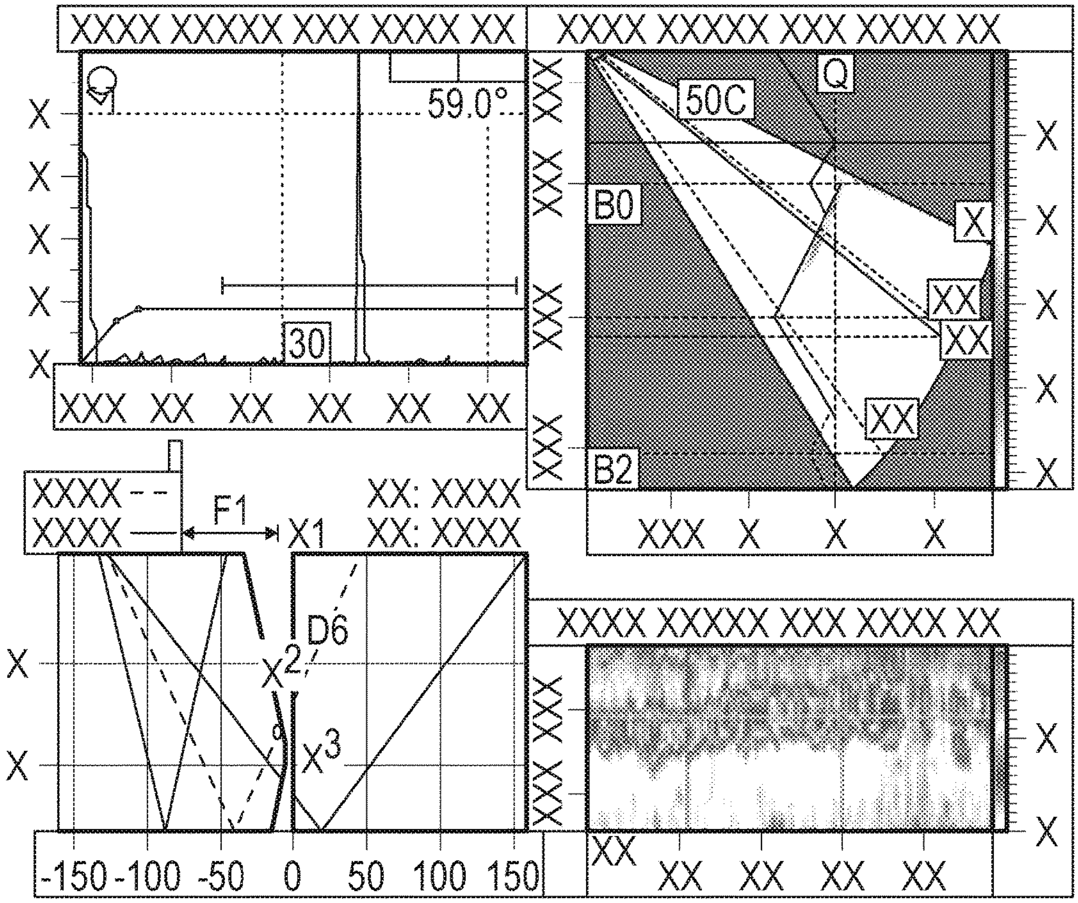
FIGURE 4: Ultrasonic Probe Data
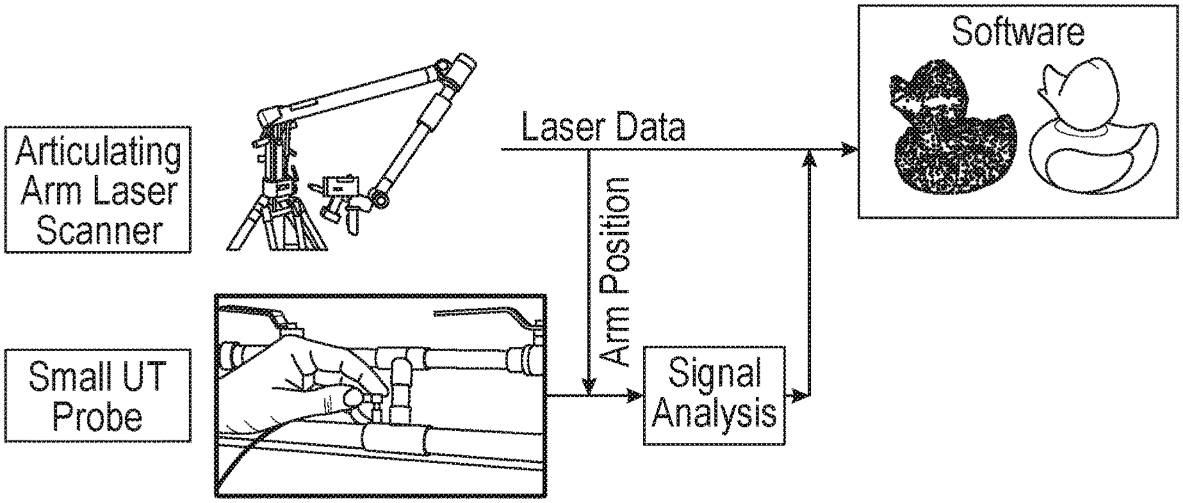
FIGURE 5: Combined Articulating Laser Scanner and Ultrasonic Probe

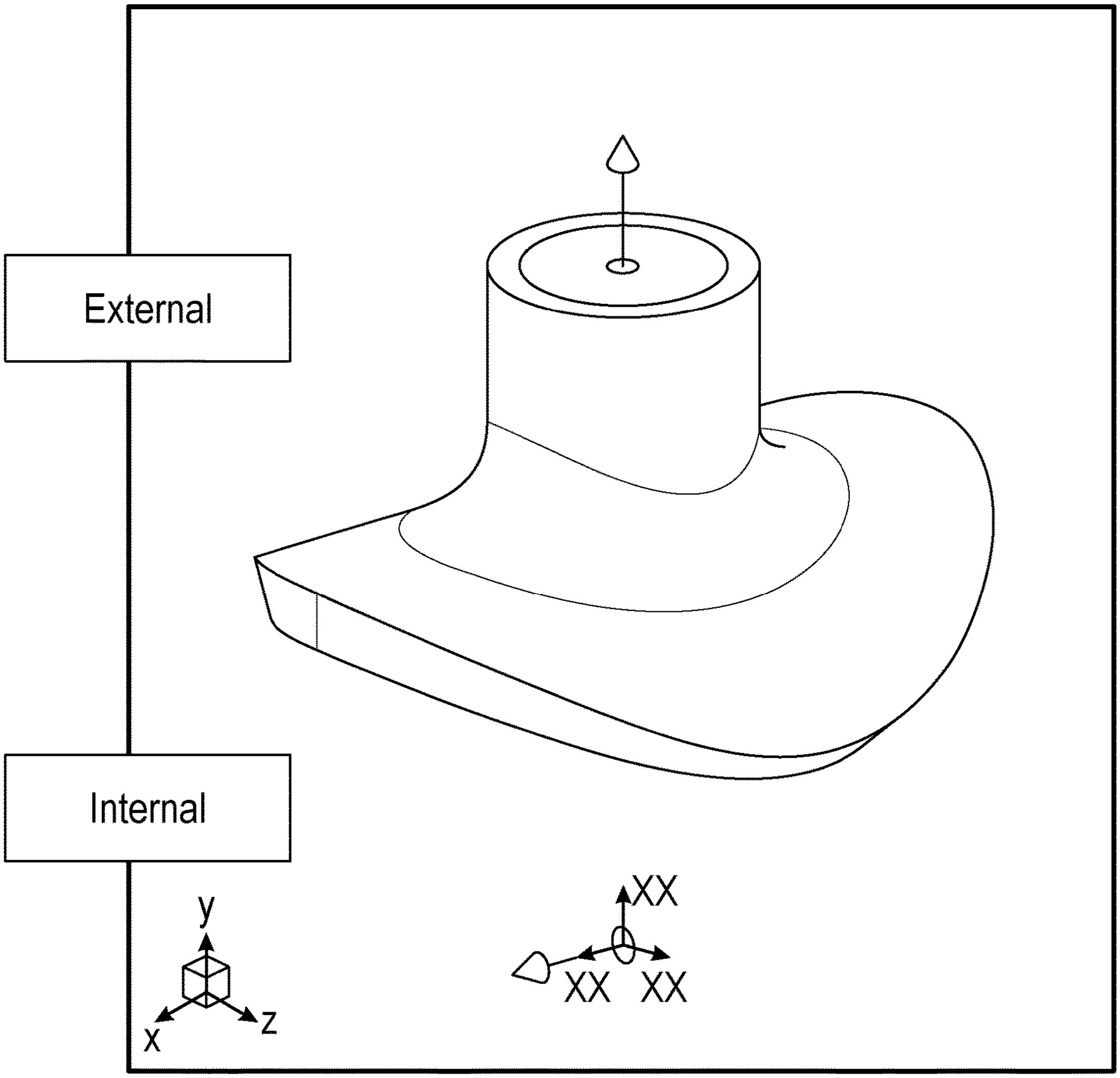
FIGURE 6: Computer Generated 3 Dimensional Component Imaging

PORTABLE ARTICULATING ULTRASONIC INSPECTION SCANNING DEVICE AND METHOD

CROSS-REFERENCE TO RELATED APPLICATIONS

This application is a non-provisional application which claims benefit under 35 USC § 119(e) to U.S. Provisional Application Ser. No. 62/882,871 filed Aug. 5, 2019, entitled "PORTABLE ARTICULATING ULTRASONIC INSPECTION," which is incorporated herein in its entirety.

STATEMENT REGARDING FEDERALLY SPONSORED RESEARCH

None.

FIELD OF THE INVENTION

The present invention relates generally to methods of assessing internal features of oilfield equipment including elbows, connections, valves, branches, olets, and other structures. More particularly, but not by way of limitation, embodiments of the present invention include methods and apparatus for determining the physical geometric boundaries of oilfield structures using an automated articulating arm with an external laser scanner and an ultrasonic probe.

BACKGROUND OF THE INVENTION

In the process of fitness for service assessment, an apparatus and method for automated equipment to assess the integrity of various pieces of oilfield equipment by providing detailed physical geometric boundaries of the equipment, identifying uncertainty of the surface image, and providing a remediation assessment. In one embodiment, a laser scanning In the past separate equipment have been used to visualize components for defects. Coordinate measuring machine (CMM), X-ray, ultrasonic tomography (UT), computed tomography (CT), and the like. In order to obtain and assemble these separate data, each analysis would be conducted independently.

What is required is an automated equipment that can assess both the interior and exterior physical geometric boundaries of oilfield equipment using both to obtain a better visualization of inaccessible areas of oilfield equipment.

BRIEF SUMMARY OF THE DISCLOSURE

The invention more particularly includes an apparatus for imaging a 3-dimensional component having a computer operated articulating arm with 3-dimensional positioning coordinates; a laser scanner for obtaining a 3-dimensional image of the exterior surfaces of a component; a processor for generating a 3-dimensional boundary image of the exterior surfaces of said component; an ultrasonic probe for contacting said exterior surface of said component at regular intervals to generate and receive ultrasonic signals; and a processor for generating a 3-dimensional boundary image of the interior surfaces of said component from said ultrasonic signals.

In another embodiment, the invention provides a method for imaging a 3-dimensional component where a component to be imaged has an automated articulating arm attached for imaging said component, the articulating arm having a computer operated articulating arm with 3-dimensional positioning coordinates; a laser scanner for obtaining a 3-dimensional image of the exterior surfaces of a component; a processor for generating a 3-dimensional boundary image of the exterior surfaces of said component; an ultrasonic probe contacting said exterior surface of said component at regular intervals to generate ultrasonic signals; and a processor for generating a 3-dimensional boundary image of the interior surfaces of said component from said ultrasonic signals; where the physical geometric boundaries of said component are provided for both said exterior and interior surfaces of the component.

The invention provide a method for obtaining a fitness for service assessment of a component or system by attaching an automated articulating arm for imaging the component, said articulating arm having a computer operated articulating arm with 3-dimensional positioning coordinates; a laser scanner for obtaining a 3-dimensional image of the exterior surfaces of a component; a processor for generating a 3-dimensional boundary image of the exterior surfaces of said component; an ultrasonic probe contacting said exterior surface of said component at regular intervals to generate ultrasonic signals; and a processor for generating a 3-dimensional boundary image of the interior surfaces of said component from said ultrasonic signals; obtaining the physical geometric boundaries of said component for both said exterior and interior surfaces of said component; identifying one or more internal features of said component; and classifying the fitness of said component for service.

As used herein a 3-dimensional component may be an elbow, bend, tee, wye, cross, reducer, stubend, coupling, nipple, union, valve, branch, outlet, or other structure. The 3-dimensional component may be welded, bonded, molded, layered, or printed in 3 dimensions.

As used herein, an internal feature may be a bond, defect, damage, corrosion, fracture, cladding thickness, bimetallic cladding, inclusion, asymmetry, uncertainty, or other component feature.

The method may be conducted at one or more times to monitor the component over time.

BRIEF DESCRIPTION OF THE DRAWINGS

FIG. 1 shows an Example Component.

FIG. 2 demonstrates RT/X-Ray Imaging of a component.

FIG. 3 shows manual ultrasonic probe.

FIG. 4 provides example ultrasonic probe data.

FIG. 5 conceptual combined articulating laser scanner and ultrasonic probe.

FIG. 6 is an example of computer generated 3-Dimensional component imaging.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

As shown in FIG. 1, a component may have one or more in inlets, joints, structures, and or surfaces both interior and exterior that may require inspection. The component shown is after manufacture, but typically the component being inspected is in use and may contain hazardous chemicals, high pressures, and be structurally isolated making it difficult to inspect the interior of the component. The component may also have interior features that cannot be inspected even if the interior surfaces of the component are accessible. Such features include small ports, valves, welded junctions, and other inaccessible features.

In order to accurately assess the 3-dimensional structure of oilfield equipment, an articulating coordinate measuring machine (CMM) is used in conjunction with a ultrasonic probe (UT) to not only identify the outer physical geometric boundaries of the oilfield equipment, but also to map ideal locations for UT scanning, minimize the number of UT scans required to obtain a 3-dimensional physical geometric boundary, and to obtain the ideal UT scans required to visualize the oilfield equipment.

The following examples of certain embodiments of the invention are given. Each example is provided by way of explanation of the invention, one of many embodiments of the invention, and the following examples should not be read to limit, or define, the scope of the invention.

Example 1: High Pressure Junction Structure

In one embodiment, a high pressure oilfield junction may be visualized using a combined CMM and UT probe. Initially, the CMM maps the course surface of the junction including key inflection points and irregularities. Using both the UT specific features and estimated or previous junction structure measurements, the processor calculates one or more specific locations to obtain UT measurements. Once a UT measurement is obtained, the processor updates the 3-dimensional physical geometric boundaries, calculates resolution uncertainties, and determines if additional measurements are required. If the measurement is outside of a calculated uncertainty, additional measurements may be taken to resolve the uncertainty. The model continually updates to determine if the UT probe is taking accurate measurements and if internal geometric boundaries are accurately represented. Once a minimum uncertainty threshold is reached for both the CMM and the UT probe, the measurements can be halted and an accurate 3 dimensional model can be created.

Using this system, irregularities can be observed and monitored. In some cases the same UT scan can be updated over time to ensure an imperfection, corrosion, or other defect are not worsening or to determine when repair is required. The process can use the initial CMM to locate and place the UT probe at the proper location to visualize the feature quickly and update the existing model noting any changes.

Example 2: Corrosion Monitoring

In another embodiment, areas of possible corrosion are visualized using a combined CMM and UT probe. In this case the exterior surface of the area is mapped, irregularities are visualized using the UT probe. The CMM and UT probe either move or are moved along the surface of the area, and the process repeated until all irregularities are mapped. Once the irregularities are mapped, they can be either monitored or repaired as required.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

1. U.S. Pat. No. 4,492,119 (Dulapa) "Articulated arm ultrasound imaging systems," (1982).
2. U.S. Pat. No. 4,596,143 (Norel) "Method and apparatus for detecting fractures by ultrasonic echography along the wall of a material or a formation," (1982).
3. U.S. Pat. No. 7,921,575 (Little) "Method and System for Integrating Ultrasound Inspection (UT) with a Coordinate Measuring Machine (CMM)" (2009).
4. U.S. Pat. No. 8,240,210 (Wu) "Method and System For Multimodal Inspection With A Coordinate Measuring Device," (2009).
5. US20060288756 (De Meurechy) "Method and apparatus for scanning corrosion and surface defects," (2003).

The invention claimed is:

1. An apparatus for imaging a 3-dimensional component comprising:

a. a computer operated articulating arm with 3-dimensional positioning coordinates;

b. a laser scanner for obtaining a 3-dimensional image of the exterior surfaces of a component;

c. a processor for generating a 3-dimensional boundary image of the exterior surfaces of said component and mapping locations to probe said component with an ultrasonic probe in order to generate a 3-dimensional boundary image of the interior surfaces of said component;

d. an ultrasonic probe for contacting said exterior surface of said component at said mapped locations to generate and receive ultrasonic signals;

e. a processor for generating a 3-dimensional boundary image of the interior surfaces of said component from said 3-dimensional boundary image of the exterior surfaces and said ultrasonic signals, said processor configured to perform ultrasonic measurements until measurements are within reference geometric boundary thresholds for both the 3-dimensional imaging measurement and the ultrasonic measurement to render an accurate 3-dimensional service assessment of the component; and f. a 3-dimensional model of the component including said 3-dimensional boundary image of the exterior surfaces and said 3-dimensional boundary image of the interior surfaces.

2. The apparatus of claim 1, wherein said 3-dimensional component is selected from the group consisting of an elbow, bend, tee, wye, cross, reducer, stubend, coupling, nipple, union, valve, branch, and outlet.

3. The apparatus of claim 1, wherein said 3-dimensional component is welded, bonded, molded, layered, or printed in 3 dimensions.

4. The apparatus of claim 1, wherein a feature is imaged, said feature selected from the group consisting of a bond, defect, damage, corrosion, fracture, cladding thickness, bimetallic cladding, inclusion, and asymmetry.

5. The apparatus of claim 1, wherein said apparatus is used to generate said 3-dimensional boundary image of the exterior surfaces and said 3-dimensional boundary image of the interior surfaces two or more times to monitor the condition of the component over time.

6. A method for imaging a 3-dimensional component comprising:

a. providing a component to be imaged;

b. providing an automated articulating arm for imaging said component, said articulating arm comprising:

i. a computer operated articulating arm with 3-dimensional positioning coordinates;

ii. a laser scanner for obtaining a 3-dimensional image of the exterior surfaces of a component;

iii. a processor for generating a 3-dimensional boundary image of the exterior surfaces of said component and mapping locations to probe said component with an ultrasonic probe in order to generate a 3-dimensional boundary image of the interior surfaces of said component;

iv. an ultrasonic probe contacting said exterior surface of said component at said mapped locations to generate ultrasonic signals;

v. a processor for generating a 3-dimensional boundary image of the interior surfaces of said component from said 3-dimensional boundary image of the exterior surfaces and said ultrasonic signals, said processor configured to perform ultrasonic measurements until measurements are within reference geometric boundary thresholds for both the 3-dimensional imaging measurement and the ultrasonic measurement to render an accurate 3-dimensional service assessment of the component, said processor generating a 3 dimensional model of the component; and c. obtaining the physical geometric boundaries of said component for both said exterior and interior surfaces of said component from said 3-dimensional model of the component including said 3-dimensional boundary image of the exterior surfaces and said 3-dimensional boundary image of the interior surfaces.

7. The method of claim 6, wherein said 3-dimensional component is selected from the group consisting of an elbow, bend, tee, wye, cross, reducer, stubend, coupling, nipple, union, valve, branch, and outlet.

8. The method of claim 6, wherein said 3-dimensional component is welded, bonded, molded, layered, or printed in 3 dimensions.

9. The method of claim 6, wherein said 3-dimensional model includes an internal feature selected from the group consisting of a bond, defect, damage, corrosion, fracture, cladding thickness, bimetallic cladding, inclusion, and asymmetry.

10. The method of claim 6, wherein said method is conducted at one or more times to monitor the component over time.

11. A method for obtaining a fitness for service assessment comprising:

a. providing a component or system to be assessed;

b. providing an automated articulating arm for imaging said component, said articulating arm comprising:

i. a computer operated articulating arm with 3-dimensional positioning coordinates;

ii. a laser scanner for obtaining a 3-dimensional image of the exterior surfaces of a component;

iii. a processor for generating a 3-dimensional boundary image of the exterior surfaces of said component and mapping locations to probe said component with an ultrasonic probe in order to generate a 3-dimensional boundary image of the interior surfaces of said component;

iv. an ultrasonic probe contacting said exterior surface of said component at said mapped locations to generate ultrasonic signals; and v. a processor for generating a 3-dimensional boundary image of the interior surfaces of said component from said 3-dimensional boundary image of the exterior surfaces and said ultrasonic signals, said processor configured to perform ultrasonic measurements until measurements are within reference geometric boundary thresholds for both the 3-dimensional imaging measurement and the ultrasonic measurement to render an accurate 3-dimensional service assessment of the component, said processor generating a 3-dimensional model of the component;

c. obtaining the physical geometric boundaries of said component for both said exterior and interior surfaces of said component from said 3-dimensional model of the component including said 3-dimensional boundary image of the exterior surfaces and said 3-dimensional boundary image of the interior surfaces;

d. identifying one or more internal features of said component; and e. classifying the fitness of said component for service.

12. The method of claim 11, wherein said 3-dimensional component is selected from the group consisting of an elbow, bend, tee, wye, cross, reducer, stubend, coupling, nipple, union, valve, branch, and outlet.

13. The method of claim 11, wherein said 3-dimensional component is welded, bonded, molded, layered, or printed in 3-dimensions.

14. The method of claim 11, wherein said internal feature is selected from the group consisting of a bond, defect, damage, corrosion, fracture, cladding thickness, bimetallic cladding, inclusion, and asymmetry.

15. The method of claim 11, wherein said method is conducted at one or more times to monitor the component over time.

* * * * *